Jan. 7, 1958   A. H. HALL ET AL   2,818,953
OVERLOAD RELEASE TORQUE ARMS

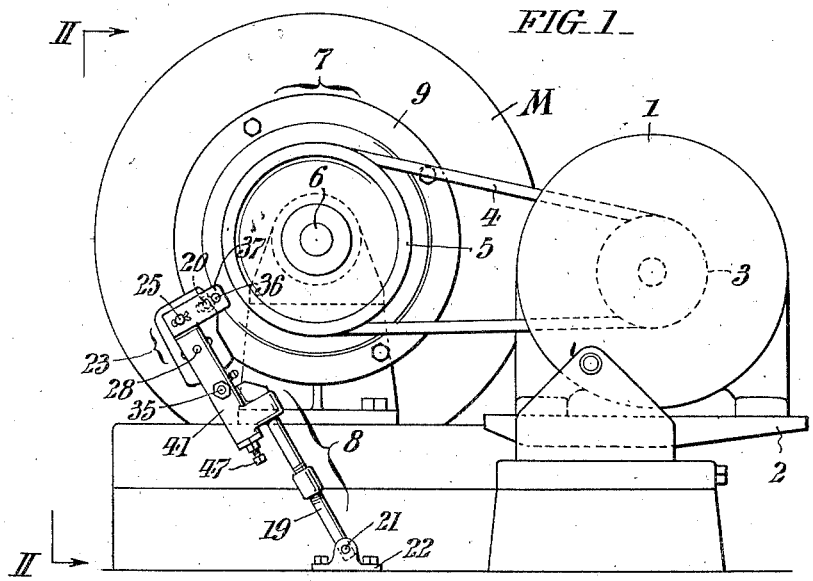
FIG_1_
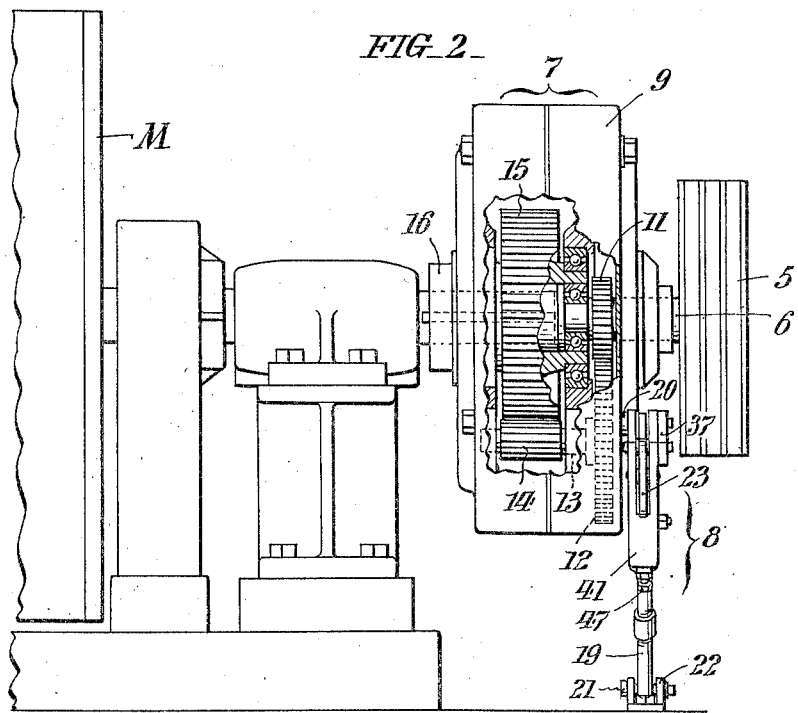
FIG_2_
INVENTORS:
Albert H. Hall &
Ellsworth J. McCloskey,
BY Paul & Paul
ATTORNEYS.

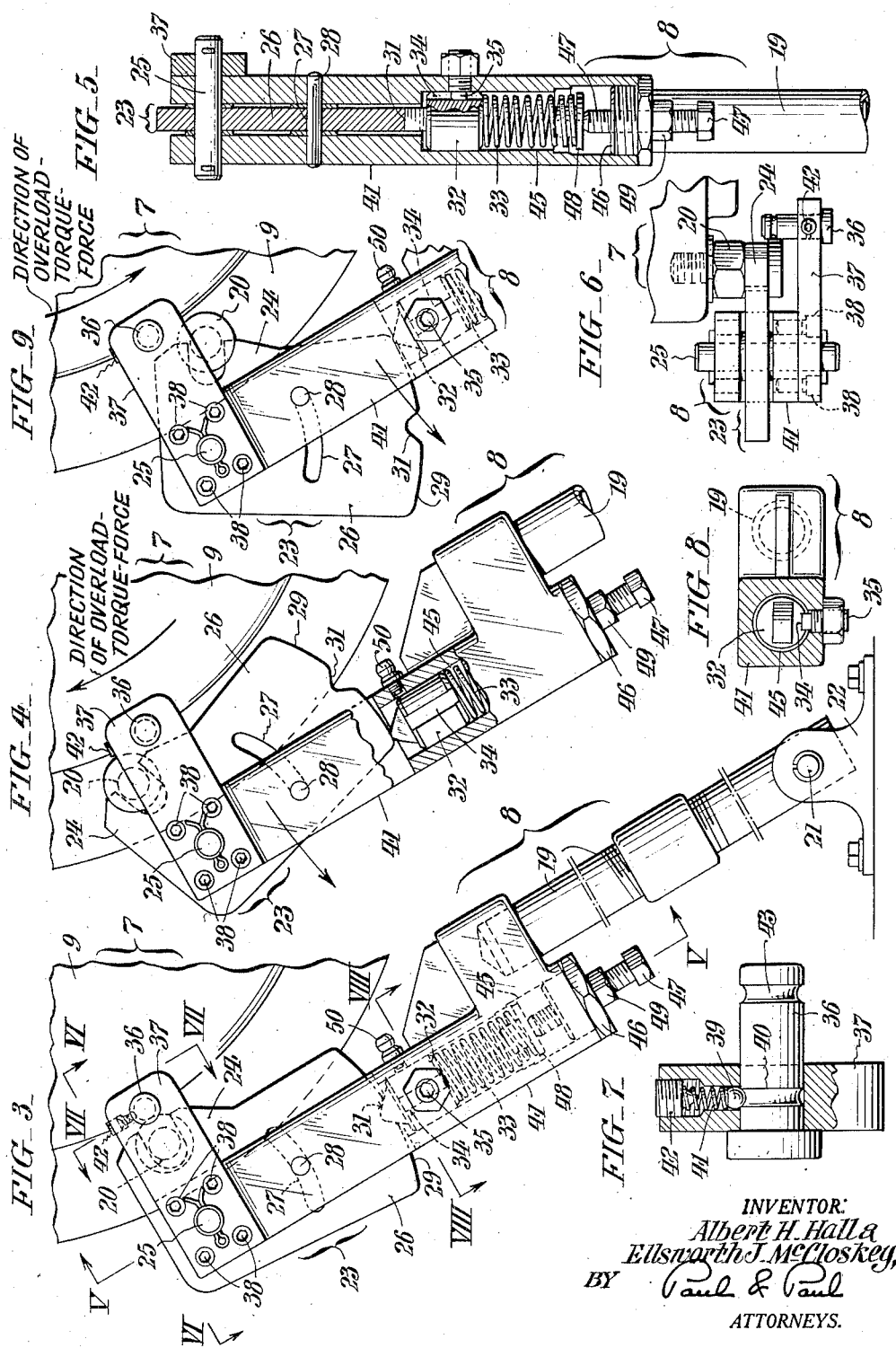

Filed Jan. 3, 1956   3 Sheets-Sheet 3

INVENTORS:
Albert H. Hall &
Ellsworth J. McCloskey,
BY Paul & Paul
ATTORNEYS.

United States Patent Office 2,818,953
Patented Jan. 7, 1958

2,818,953

OVERLOAD RELEASE TORQUE ARMS

Albert H. Hall, Philadelphia, and Ellsworth J. McCloskey, Norristown, Pa., assignors to The American Pulley Company, Philadelphia, Pa., a corporation of Pennsylvania Application January 3, 1956, Serial No. 557,113

8 Claims. (Cl. 192—150)

This invention relates to overload release torque arms useful for example in connection with change speed drive units of the type disclosed in United States Patent No. 2,116,166 granted to Joseph D. Christian on May 3, 1938, the present invention being an improvement of the generally similar torque arm shown and described in United States Patent No. 2,554,969 granted to William A. Williams on May 29, 1951.

In the Williams patent, supra, spring pressed fingers are relied upon to normally keep the pivoted swing element at the distal end of the torque arm yieldingly engaged with the eccentrically-disposed projection on the casing of the speed change unit. Due to wear and/or to sticking in the guide sleeves as a result of rust and dirt accumulation, the fingers failed in their function to keep the torque arm connected to the speed change unit. Being subject to constant vibration, the torque arm would frequently fall away from the speed change unit and so required to be reconnected to the speed change unit each time with consequent idling of the driven machine.

The chief aim of our invention is to overcome the above mentioned drawback. This objective is realized in practice as hereinafter more fully set forth, through relatively simple changes in the construction of the torque arm.

Another object is to provide improved means for adjusting the spring means by which the pivoted swinging element of the torque arm is maintained in operative position, to predetermine release of the arm under different degrees of overload torque which may be induced in the change speed unit.

Other objects and attendant advantages will appear from the following detailed description of the attached drawings, wherein:

Fig. 1 is a view in side elevation of a motor with a speed reduction drive mechanism conveniently embodying the improved overload release torque arm of our invention.

Fig. 2 shows an end elevation of the drive, viewed as indicated by the angled arrows II—II in Fig. 1, a portion of the speed change unit being broken away to expose its interior construction.

Fig. 3 is a fragmentary view drawn to a larger scale and showing the manner in which the torque arm is applied to the speed change unit.

Fig. 4 is a view similar to Fig. 3 with a portion broken away, showing the torque arm released under overload and about to drop away from the speed change unit.

Fig. 5 is a longitudinal sectional view of the torque arm taken as indicated by the angled arrows V—V in Fig. 3.

Fig. 6 is a view in elevation looking as indicated by the angled arrows VI—VI in Fig. 3.

Fig. 7 is a detail view, partly in section and partly in elevation, taken as indicated by the angled arrows VII—VII in Fig. 3.

Fig. 8 is a cross section of the torque arm taken as indicated by the angled arrows VIII—VIII in Fig. 3.

Fig. 9 is a view similar to Fig. 8 showing the torque arm released by overload torque induced in the opposite direction or as indicated by the arrow.

Figure 10:
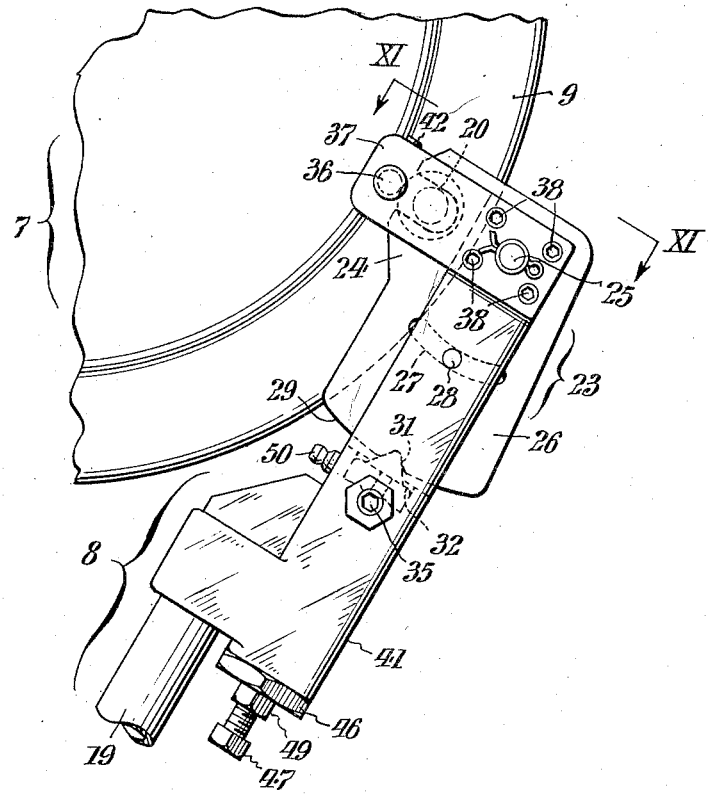
Fig. 10 is a view similar to Fig. 3 showing the torque arm reversely positioned with respect to the speed change unit.

The reduction drive herein shown, for convenience of exemplification, includes a motor 1 which is mounted on a base 2 and has a drive pulley 3 connected by a belt 4 with a driven pulley 5 on the input shaft 6 of the speed change unit comprehensively designated 7. The gearing of the change speed unit 7 is enclosed in a casing 9 and includes a spur pinion 11 on its input shaft 6 which drives a second gear wheel 12 on a shaft 13 journalled within said casing. A third gear wheel 14 fixed on the shaft 13 drives a fourth gear wheel 15 which is fast on the output shaft 16 of the unit. The output shaft 16 of the speed change unit 7 is directly secured to the shaft of the machine M to be driven. The best illustrated speed change unit, is of well known construction and per se, is not of our invention.

The improved torque arm 8, with which the present invention is more particularly concerned, serves in the usual manner to normally prevent bodily rotation of the speed change unit 7 about the axis of the shaft 16 by engagement of said arm with an eccentrically-disposed laterally-projecting stud 20 on the casing 9 of said unit. As best seen in Figs. 3–9, the torque arm 8 comprises a shank 19 which is pivotally connected at 21 at its lower end, to an anchorage bracket 22 secured to the floor or other stationary surface, and which is clevised or bifurcated at its upper or distal end to receive a pivoted swing element 23 having a jaw 24 that partially surrounds and releasably engages the stud 20 on the casing 9 of the speed change unit 7 from one side in the interval between the heads of said stud. As shown, the torque arm 8 is disposed tangentially relative to the speed change unit 7 at such an angle that, upon release, it will fall away from the latter by its own weight. The element 23 is in the form of a bell crank fulcrumed by means of a pin 25 within the bifurcated end of the torque arm 19, the short arm of said element providing the jaw 24, and the longer arm 26 having an arcuate slot 27 engaged by a pin 28 whereby the swing of said element is limited to approximately twenty degrees. The long arm 26 of the element 23 terminates in an edge 29 which is curved on an arc struck from the axis of the pivot pin 25, and which has a central V-shaped notch 31 adapted to be engaged by the wedge shaped end of the detent 32. The detent 32 is urged into engagement with the notch 31 by a spring 33, and has a longitudinal groove 34 engaged by a key 35 which prevents rotation about its axis while permitting it to move toward and away from said notch. The mouth of the jaw 24 opens substantially at a right angle to the axis of the shank 19. Arranged to engage the projection 20 on the casing 9 of the speed change unit 7 from the side opposite the jaw 24 of the element 23, in accordance with our invention, is a stud 36 which is carried, with capacity to be retracted, by a plate-like part 37 and which is removably secured by screws 38 to one side of distal clevised end portion of the torque arm 8. Normally, the stud 36 is yieldingly held in projected position as shown in Fig. 7 by a ball 39 engaged in a circumferential groove 40 in said stud, said ball being urged by a spring 41 which is lodged in a socket hole in the part 37 and which is adjustable by means of a screw 42 threadedly engaged in said socket hole. The stud 36 is also provided with a second circumferential groove 43 in spaced relation to the groove 40, for engagement by the ball 39 to hold the stud when retracted.

The offset portion 41 of the shank 19 has a bore 45 in which the spring 33 is lodged and in which the detent 32 is axially guided. Threaded into the bottom end of the bore is a plug 46 in which a screw 47 is axially engaged, the inner end of said screw bearing against a buttressing disk 48 for the spring 33. By this means, the pressure of the spring 33 can be closely adjusted and the adjustment set by a nut 49 on the screw 47 adapted to clamp against the bottom end of the offset portion 41 of the torque arm 8. Lubricating oil is introduced into the bore 45 through the fitting indicated at 50.

Figure 11:
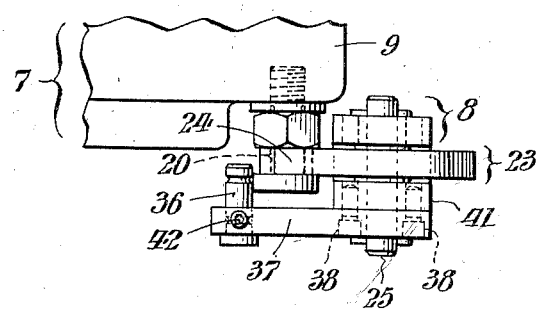
Fig. 11 is a view in elevation looking as indicated by the angled arrows XI—XI in Fig. 10.

In instances where necessary or desirable, the torque arm 8 can be reversely positioned relative to the speed change unit 7 as shown in Figs. 10 and 11, this adaptation being accomplished simply by transferring the part 37, which carries the stud 36, to the opposite side of the clevised end portion of the torque arm in a manner readily understood from these illustrations.

While in accordance with the provisions of the statutes, we have illustrated and described the best form of embodiment of our invention now known to us it will be apparent to those skilled in the art that changes may be made in the form of the apparatus described without departing from the spirit and scope of the invention, as set forth in the appended claims, and that in some cases certain features of our invention may be used to advantage without a corresponding use of other features.

Having thus described our invention, we claim:

1. In a torque arm for the purpose described, pivotally connected at one end to a fixed anchorage, means for connecting the distal end of the arm to an eccentrically disposed projection on a rotary member of a machine with capacity for self release when a predetermined force is applied by the rotatable member, said means including an element pivoted to the arm at the distal end thereof and provided with a jaw for engaging the projection on the rotary member of a machine from one side, and a stud on a lateral lever extension at the distal end of the arm for engaging the projection on the rotary member from the opposite side; and yielding means embodied in the arm for normally maintaining the pivoted element in operative position relative to the projection on the rotary machine member.

2. A torque arm according to claim 1, further including incorporated means for limiting the swing of the pivoted element upon its release from the projection on the rotatable element.

3. A torque arm according to claim 2, further including a spring pressed ball adapted to engage spaced circumferential grooves in the stud for yieldingly maintaining the stud in advanced or retracted position on the shank 4. A torque arm according to claim 1, wherein the pivoted element is in the form of a bell crank lever of which one arm provides the jaw, and wherein the yielding means includes a spring-urged detent for normally engaging into a notch in the other arm of the lever.

5. A torque arm according to claim 4, further including means for adjusting the spring effective upon the detent 6. A torque arc according to claim 4, wherein the detent is in the form of a slide element confined to a guide bore in the torque arm; wherein the spring effective upon the detent is of the helical type; wherein the bore is closed by a plug; and wherein the spring is buttressed by a disk and is adjustable by a screw threadedly engaged in the plug with its end bearing against the buttressing disk.

7. A torque arm according to claim 1, wherein the stud is axially retractable to facilitate re-connection of the torque arm to the rotatable object.

8. A torque arm according to claim 1, wherein the stud is carried by a separately attached part capable of removal for transfer from one side of the torque arm to the other as and for the purpose set forth.

References Cited in the file of this patent
UNITED STATES PATENTS

| | | |
|---|---|---|
| 2,526,552 | Gillespie | Oct. 17, 1950 |
| 2,554,969 | Williams | May 29, 1951 |